(12) United States Patent
Abernathy et al.

(10) Patent No.: US 7,991,979 B2
(45) Date of Patent: Aug. 2, 2011

(54) ISSUING LOAD-DEPENDENT INSTRUCTIONS IN AN ISSUE QUEUE IN A PROCESSING UNIT OF A DATA PROCESSING SYSTEM

(75) Inventors: Christopher M. Abernathy, Austin, TX (US); Mary D Brown, Austin, TX (US); William E. Burky, Austin, TX (US); Todd A. Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 12/236,175

(22) Filed: Sep. 23, 2008

(65) Prior Publication Data
US 2010/0077181 A1 Mar. 25, 2010

(51) Int. Cl.
*G06F 9/30* (2006.01)
(52) U.S. Cl. .................. 712/214; 712/216; 712/225
(58) Field of Classification Search .................. 712/214, 712/216, 225
See application file for complete search history.

(56) References Cited

U.S. PATENT DOCUMENTS

| | | | |
|---|---|---|---|
| 5,809,530 A * | 9/1998 | Samra et al. ............. | 711/140 |
| 5,931,957 A * | 8/1999 | Konigsburg et al. ....... | 714/48 |
| 6,148,394 A | 11/2000 | Tung et al. | |
| 6,216,219 B1 * | 4/2001 | Cai et al. ............. | 712/207 |
| 6,275,906 B1 * | 8/2001 | Nunez et al. ........... | 711/141 |
| 6,336,168 B1 * | 1/2002 | Frederick et al. ........ | 711/141 |
| 6,760,816 B1 * | 7/2004 | Ju et al. ............ | 711/137 |
| 6,883,086 B2 | 4/2005 | Dundas | |
| 6,976,152 B2 * | 12/2005 | Yeh et al. ............ | 712/217 |
| 7,269,714 B2 * | 9/2007 | Yeh et al. ............ | 712/215 |
| 7,293,160 B2 * | 11/2007 | Chaudhry et al. ........ | 712/214 |
| 7,376,816 B2 * | 5/2008 | Barrick et al. ......... | 712/218 |
| 7,461,239 B2 * | 12/2008 | Abernathy et al. ....... | 712/220 |
| 7,487,297 B2 * | 2/2009 | El-Essawy et al. ........ | 711/137 |
| 7,529,911 B1 * | 5/2009 | Spracklen et al. ........ | 712/207 |
| 2002/0091914 A1 * | 7/2002 | Merchant et al. ......... | 712/219 |
| 2003/0061465 A1 * | 3/2003 | Yeh et al. ............ | 712/214 |
| 2005/0278509 A1 * | 12/2005 | Chaudhry et al. ......... | 712/214 |
| 2006/0106987 A1 * | 5/2006 | Barrick et al. ......... | 711/125 |
| 2007/0089112 A1 * | 4/2007 | Jensen ............... | 718/100 |
| 2007/0180221 A1 * | 8/2007 | Abernathy et al. ........ | 712/225 |
| 2009/0210675 A1 * | 8/2009 | Alexander et al. ........ | 712/216 |

* cited by examiner

*Primary Examiner* — Idriss N Alrobaye
(74) *Attorney, Agent, or Firm* — Dillon & Yudell LLP

(57) ABSTRACT

A system and method for issuing load-dependent instructions in an issue queue in a processing unit. A load miss queue is provided. The load miss queue comprises a physical address field, an issue queue position field, a valid identifier field, a source identifier field, and a data type field. A load instruction that misses a first level cache is dispatched, and both the physical address field and the data type field are set. A load-dependent instruction is identified. In response to identifying the load-dependent instruction, each of the issue queue position field, valid identifier field, and source identifier field are set. If the issue queue position field refers to a flushed instruction, the valid identifier field is cleared. The load instruction is recycled, and a value of the valid identifier field is determined. The load-dependent instruction is then selected for issue on a next processing cycle independent of an age of the load-dependent instruction.

8 Claims, 8 Drawing Sheets

| RTAG 202 | DEP QTAG 204 | DQV 206 | DQS 208 | TYPE 210 |
|---|---|---|---|---|
| | | | | |

ISSUING LOAD-DEPENDENT INSTRUCTIONS IN AN ISSUE QUEUE IN A PROCESSING UNIT OF A DATA PROCESSING SYSTEM

BACKGROUND

1. Technical Field

The present invention relates generally to data processing systems and in particular to methods for issuing load-dependent instructions within data processing systems.

2. Description of the Related Art

Early microprocessors executed only one instruction at a time and executed instructions in an order determined by the compiled machine-language program running on the microprocessor. Such microprocessors are known as "sequential" microprocessors. Various techniques, such as pipelining, superscaling, and speculative instruction execution, are utilized to improve the performance of sequential microprocessors. Pipelining breaks the execution of instructions into multiple stages, in which each stage corresponds to a particular execution step. Pipelined designs enable new instructions to begin executing before previous instructions are finished, thereby increasing the rate at which instructions can be executed.

"Superscalar" microprocessors typically include multiple pipelines and can process instructions in parallel using two or more instruction execution pipelines in order to execute multiple instructions per microprocessor clock cycle. Parallel processing requires that instructions can be dispatched for execution at a sufficient rate. However, the execution rate of microprocessors has typically outpaced the ability of memory devices and data buses to supply instructions to the microprocessors. Therefore, conventional microprocessors utilize one or more levels of on-chip cache memory to increase memory access rates.

Conventional microprocessors utilize speculative instruction execution to address pipeline stalls by enabling a second instruction that is data dependent on a first instruction to enter an execution pipeline before the first instruction has passed completely through the execution pipeline. Thus, in speculative instruction microprocessors, the data dependent second instruction, which is often referred to as a "consumer" instruction, depends on the first instruction, which is referred to as a "producer" instruction.

In microprocessors that utilize speculative instruction execution, there is a delay between the decision to issue an instruction and the actual execution of the instruction. For example, in the case of load instructions, there may be a significant delay between the issue of a load instruction and the corresponding data fetch from cache memory. A consumer instruction, dependent on a delayed load producer instruction, may be issued before confirmation by the cache system that the load data required is available in the cache. When the required data is not found in the cache, dependent consumer instructions can execute and access incorrect data.

SUMMARY OF ILLUSTRATIVE EMBODIMENTS

Disclosed are a system and method for issuing load-dependent instructions in an issue queue in a processing unit of a data processing system. A load miss queue is provided, where the load miss queue comprises a physical address field that indicates where load instruction data is stored for said load miss queue, an issue queue position field that indicates an issue queue position of a load-dependent instruction, a valid identifier field that indicates if the load-dependent instruction is valid, a source identifier field that indicates a source of the load-dependent instruction that is dependent on a load instruction, and a data type field that indicates a type of the load instruction data. A load instruction that misses a first level cache is dispatched, and both the physical address field and the data type field are set. A load-dependent instruction is identified, where the load-dependent instruction comprises one or more from the group consisting of: an instruction present in one of a plurality of issue queues; and an instruction dispatched from one of a plurality of latches. In response to identifying the load-dependent instruction, each of the issue queue position field, valid identifier field, and source identifier field are set. If the issue queue position field refers to a flushed instruction, the valid identifier field is cleared. The load instruction is recycled, and a value of the valid identifier field is determined. The load-dependent instruction is then selected for issue on a next processing cycle independent of an age of the load-dependent instruction.

The above, as well as additional objectives, features, and advantages of the present invention, will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 is an exemplary load-miss queue (LMQ) as illustrated in FIG. 1;

DETAILED DESCRIPTION OF AN ILLUSTRATIVE EMBODIMENT

Figure 1A:
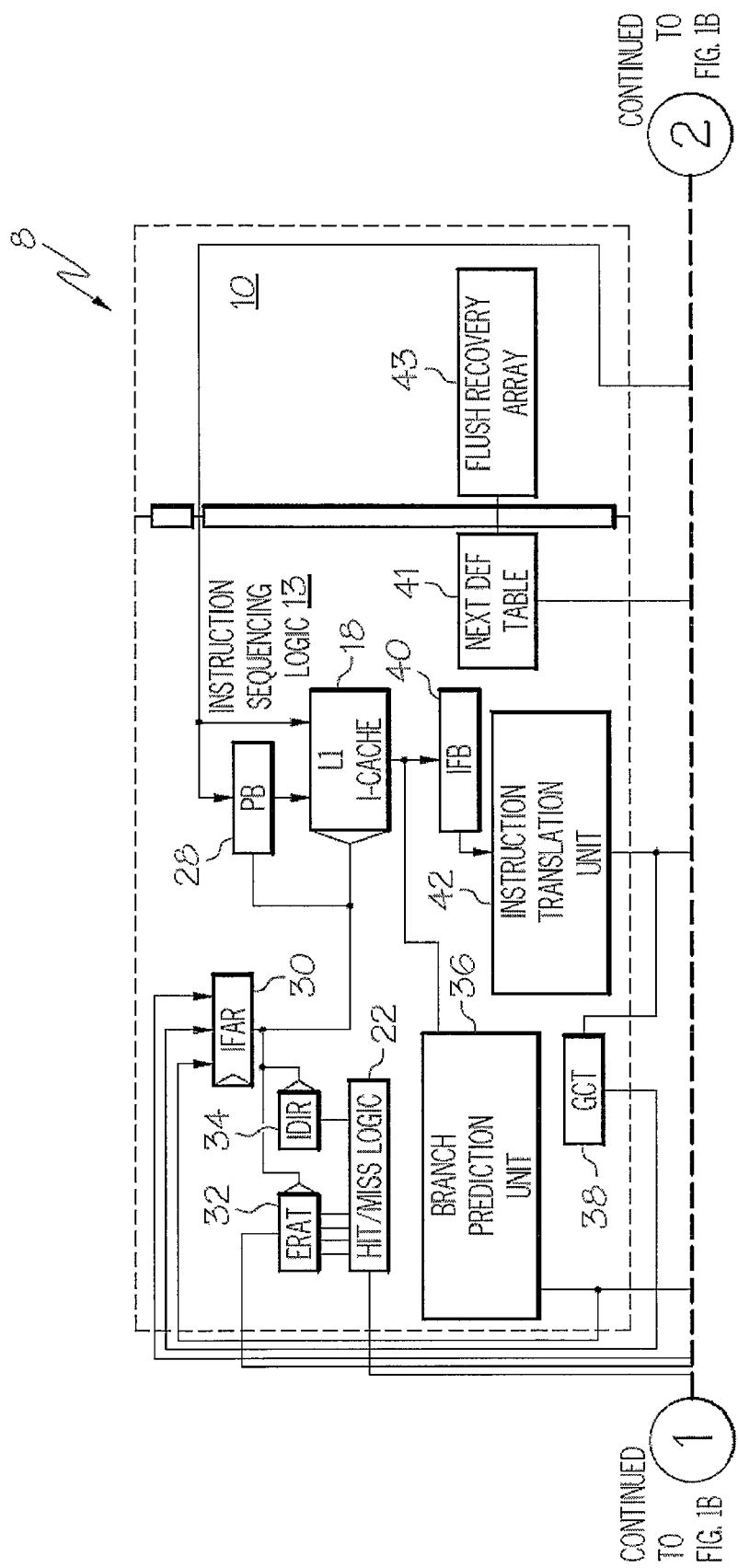
FIG. 1 is an exemplary embodiment of a data processing system in accordance with an embodiment of the present invention.

The illustrative embodiments depict systems and methods for issuing load-dependent instructions in an issue queue in a processing unit. A load miss queue is provided. The load miss queue comprises a physical address field, an issue queue position field, a valid identifier field, a source identifier field, and a data type field. A load instruction that misses a first level cache is dispatched, and both the physical address field and the data type field are set. A load-dependent instruction is identified. In response to identifying the load-dependent instruction, each of the issue queue position field, valid identifier field, and source identifier field are set. If the issue queue position field refers to a flushed instruction, the valid identifier field is cleared. The load instruction is recycled, and a value of the valid identifier field is determined. The load-dependent instruction is then selected for issue on a next processing cycle independent of an age of the load-dependent instruction.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the terms "comprise", "comprises", and "comprising" are used in an open-ended fashion, and thus should be interpreted to mean "including, but not limited to . . . ". Also, the term "coupled" is intended to mean either an indirect or direct connection. Thus, if a first device is coupled to a second device, that connection may be through a direct connection, or through an indirect connection via other devices and connections.

Figure 1B:
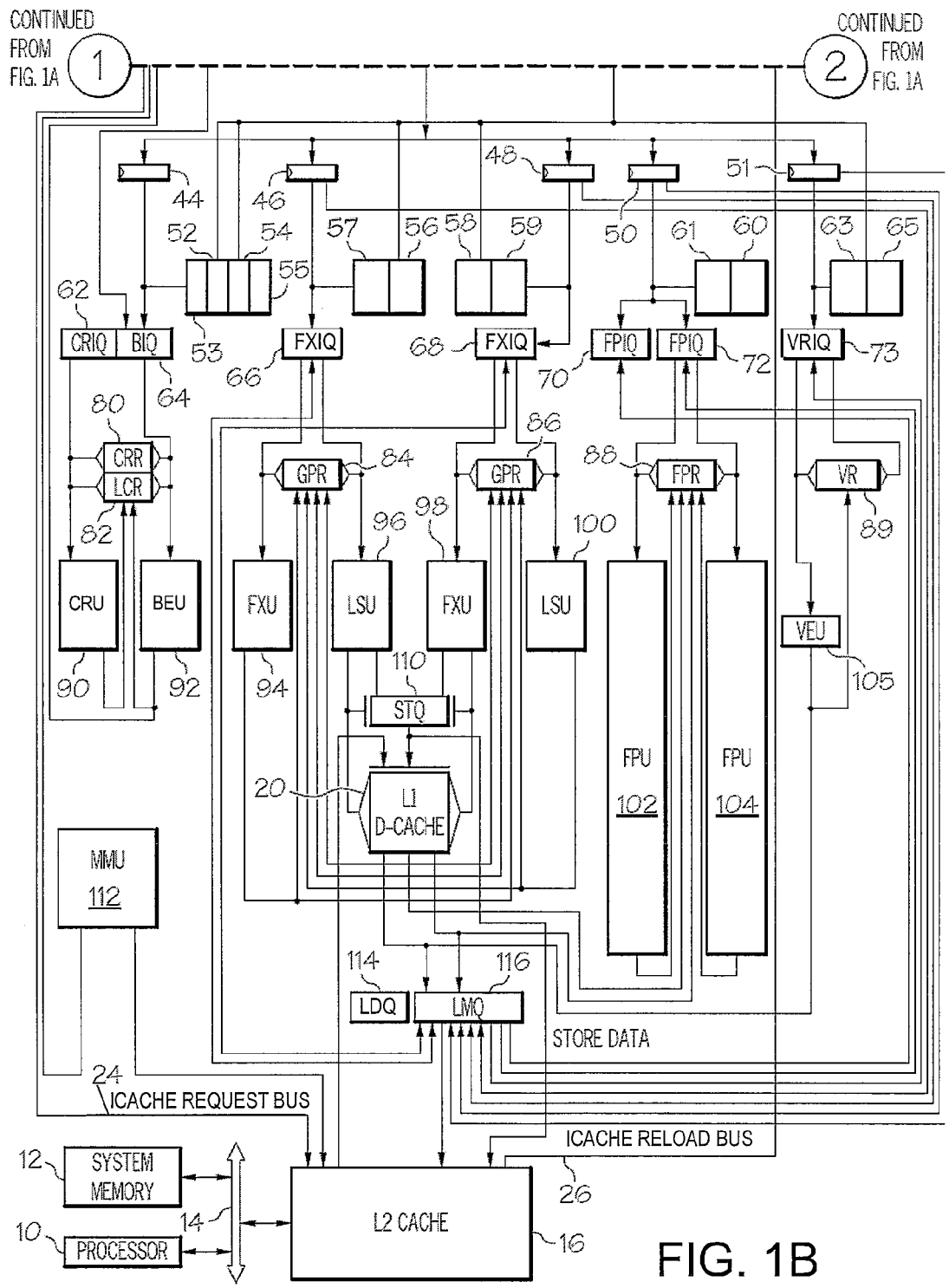

With reference now to FIG. 1, there is illustrated a high level block diagram of an exemplary data processing system 8 in accordance with the present invention. Data processing system 8 includes a processor 10 comprising a single integrated circuit superscalar processor, which, as discussed further below, includes various execution units, registers, buffers, memories, and other functional units that are all formed by integrated circuitry. Processor 10 may be coupled to other devices, such as a system memory 12 and a second processor 10, by an interconnect fabric 14 to form a data processing system 8 such as a workstation or server computer system. Processor 10 also includes an on-chip multi-level cache hierarchy including a unified level two (L2) cache 16 and a bifurcated level one (L1) instruction (I) and data (D) caches 18 and 20, respectively. As is well known to those skilled in the art, caches 16, 18, and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of at least three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by the multiple sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48, 50, and 51 according to instruction type. That is, branch instructions and other condition register (CR) modifying instructions are dispatched to latch 44, fixed-point and load-store instructions are dispatched to either of latches 46 and 48, floating-point instructions are dispatched to latch 50, and vector instructions are dispatched to latch 51. Each instruction requiring a rename register for temporarily storing execution results is then assigned one or more registers within a register file by the appropriate one of CR mapper 53, link and count register (LCR) mapper 55, exception register (XER) mapper 57, general-purpose register (GPR) mapper 59, floating-point register (FPR) mapper 61, and vector register (VR) mapper 65. According to the illustrative embodiment, register mapping may be performed by a simplified register file mapper, a reorder buffer (ROB), or other similar devices known to those skilled in the art. Register file mapping can thus be performed at instruction issue time or close to result write-back time, thereby reducing the lifetimes of allocated renames and increasing the efficiency of rename usage.

Instruction sequencing logic 13 tracks the allocation of register resource to each instruction using the appropriate one of CR last definition (DEF) table 52, LCR last DEF table 54, XER last DEF table 56, GPR last DEF table 58, FPR last DEF table 60, and VR last DEF table 63.

Data processing system 8 also includes flush recovery array 43, which is coupled to next DEF tables 41. Flush recovery array 43 enables instruction sequencing logic 13 to utilize next DEF tables 41 to track instruction data dependencies and perform flush recovery operations.

After latches 44, 46, 48, 50, and 51, the dispatched instructions are temporarily placed in an appropriate one of CR issue queue (CRIQ) 62, branch issue queue (BIQ) 64, fixed-point issue queues (FXIQs) 66 and 68, floating-point issue queues (FPIQs) 70 and 72, and VR issue queue (VRIQ) 73. From issue queues 62, 64, 66, 68, 70, 72, and 73, instructions can be issued opportunistically (i.e., possibly out-of-order) to the execution units of processor 10 for execution. In some embodiments, the instructions are also maintained in issue queues 62, 64, 66, 68, 70, 72, and 73 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 98 for executing fixed-point instructions, two load-store units (LSUs) 96 and 100 for executing load and store instructions, two floating-point units (FPUs) 102 and 104 for executing floating-point instructions, and vector execution unit (VEU) 105 for executing vector instructions. Each of execution units 90, 92, 94, 96, 98, 100, 102, 104, and 105 is preferably implemented as an execution pipeline having a number of pipeline stages.

During execution within one of execution units 90, 92, 94, 96, 98, 100, 102, 104, and 105, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. Similarly, when executing vector instructions, VEU 105 accesses the VR register file 89, which in a preferred embodiment contains multiple VRs and a number of VR rename registers. General-purpose register files (GPRs) 84 and 86, which are synchronized, duplicate register files, store fixed-point and integer values accessed and produced by FXUs 94 and 98 and LSUs 96 and 100. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 100.

After an execution unit finishes execution of an instruction, the execution notifies GCT 38, which schedules completion of instructions in program order. To complete an instruction executed by one of CRU 90, FXUs 94 and 98, FPUs 102 and 104, or VEU 105, GCT 38 signals the appropriate last DEF table. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, BPU 36 updates its prediction facilities, if necessary. If, however, the calculated path address does not match the predicted path address, BEU 92 supplies the correct path address to IFAR 30, and BPU 36 updates its prediction facilities, as described further below. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12. LMQ 116 is discussed herein in more detail in conjunction with FIGS. 2 and 3.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Those with skill in the art will appreciate that in a modern pipelined, superscalar microprocessor, it is desirable to minimize pipeline stalls such as pipeline "bubbles" (i.e., non-consecutive instruction sequences where microprocessor facilities are idle because no instruction was issued for processing at some point in the instruction stream). One way to address pipeline stalls is to optimize the operation of the issue queue to ensure that instructions are issued in as much of a continuous stream as possible.

In a non-shifting issue queue, one timing critical sequence includes: (1) searching for instructions with all of their source operands "ready"; (2) determining which one of the "ready" instructions is the oldest "ready" instruction; and (3) issuing the instruction that satisfies conditions (1) and (2). Once an instruction is issued, a broadcast of a data tag to the issue queue occurs to identify and wakeup any dependent instructions resident in the issue queue. The first instruction is a "producer" instruction while the dependent instructions are "consumer" instructions, as previously discussed. As processing speeds and demands increase, steps (1) and (2) above need to be refined.

One method utilized to refine steps (1) and (2) in a non-shifting issue queue includes determining the instruction that will issue one cycle before that instruction is actually issued. Utilizing this method, an entire cycle may be utilized to evaluate all "ready" instructions to find the oldest "ready" instruction.

For load producer instructions that miss the L1 data cache, the scheduling of the issue of consumer instructions dependent (hereinafter referred to as "load-dependent instructions") on those load producer instructions is a challenge, since the issue of the load-dependent instructions is predicated on when data is returned from other levels of the memory hierarchy (e.g., L2 cache, system memory, hard disk drive, etc.). Typically, a data tag for the load data is broadcast to the issue queue just in time to "wakeup" load-dependent instructions to issue during the following cycle. However, those with skill in the art will appreciate that in the above-mentioned non-shifting issue queue, the load-dependent instructions must be marked as "ready" a cycle earlier than the actual time of issue. Therefore, the normal method of broadcasting the data tag against the issue queue will issue any load-dependent instruction a cycle later than normal in a non-shifting issue queue. The later issuance of load-dependent instructions negatively impacts performance, since load-dependent instructions often lie in a critical path of code streams.

According to an embodiment of the present invention, as load instructions are determined to miss the L1 data cache, a unique entry corresponding to the missed load instruction is placed in (LMQ) 116. FIG. 2 is a more detailed block diagram depicting exemplary load miss queue (LMQ) 116. For each LMQ 116 entry, a Dep QTAG is stored in Dep QTAG field 204, which indicates the non-shifting queue's position where the load producer instruction's first load-dependent instruction is stored. When the data corresponding to the missed load instruction is retrieved and placed in the L1 cache, LMQ 116 is indexed for the unique entry corresponding to the missed load instruction to retrieve the load-dependent instruction's QTAG. The QTAG is used to issue the load-dependent instruction without having to undergo the normal procedure of broadcasting the load data tag against LMQ 116 and then the issue queue (e.g., FXIQ 66, FXIQ 68, FPIQ 70, FPIQ 72, and VRIQ 73), which wakes up the load-dependent instruction, and determines the age of all "ready" instruction to find the oldest "ready" instruction.

Referring back to FIG. 2, RTAG field 202 indicates the physical address of where the load data will be stored for the given LMQ entry (i.e., where the data will be written to a register file). Type field 210 indicates the data type of the load (i.e., fixed-point load, floating point load, etc.). As previously discussed, Dep QTAG field 204 indicates what is the issue queue position of the first load-dependent instruction. DQv field 206 indicates whether or not the load-dependent instruction listed in Dep QTAG field 204 is valid. DQs field 208 indicates which source of the dependent instruction depends upon the load, since the dependent instruction may have multiple sources. Sometimes, instructions may be flushed from LMQ 116, which destroys the dependency of the load-dependent instruction on the producer instruction.

Figure 3A:
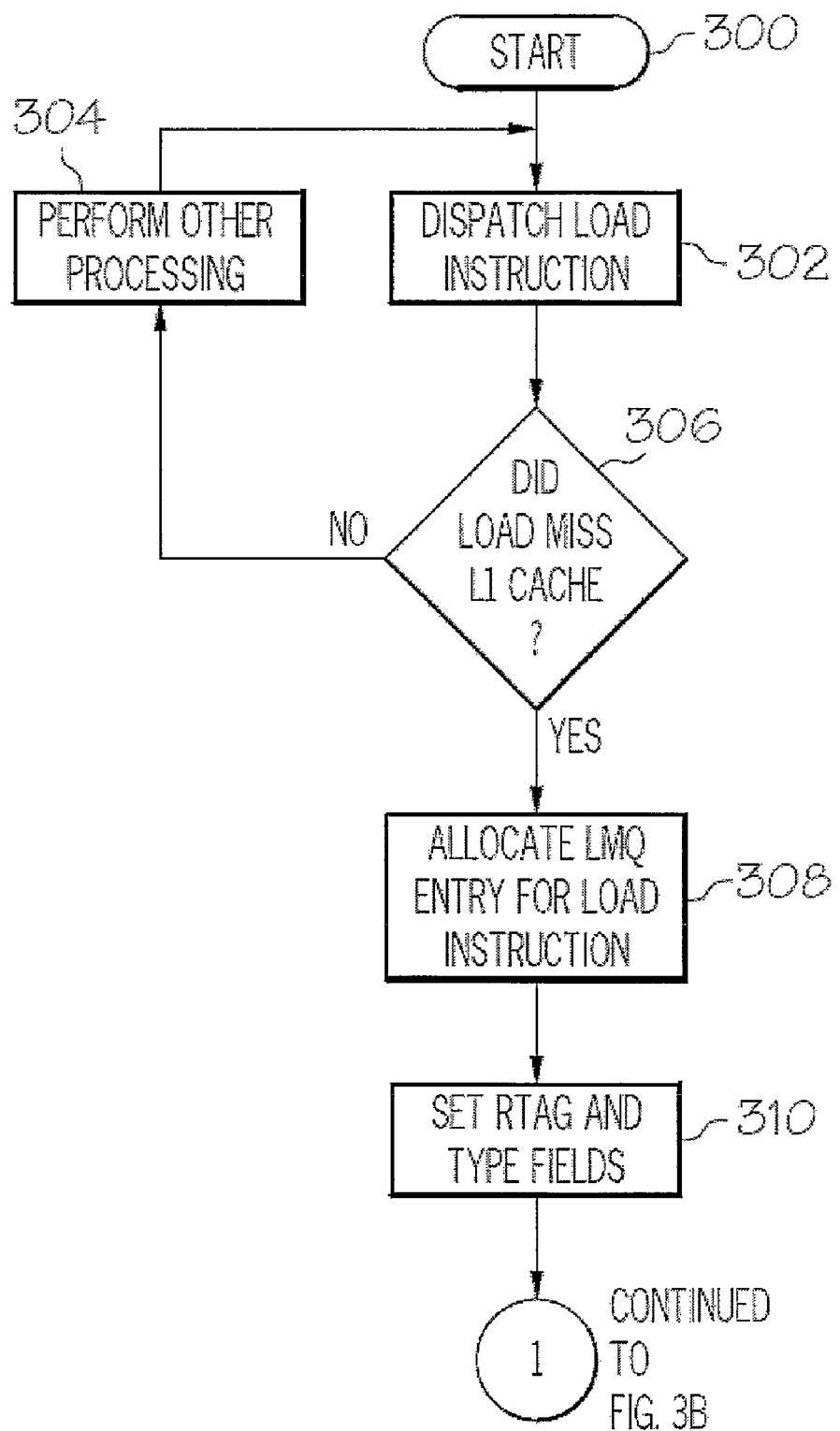
FIG. 3 is a high-level logical flowchart illustrating an exemplary method for issuing load-dependent instructions from an issue queue in a data processing system in accordance with an embodiment of the present invention.
Figure 3B:
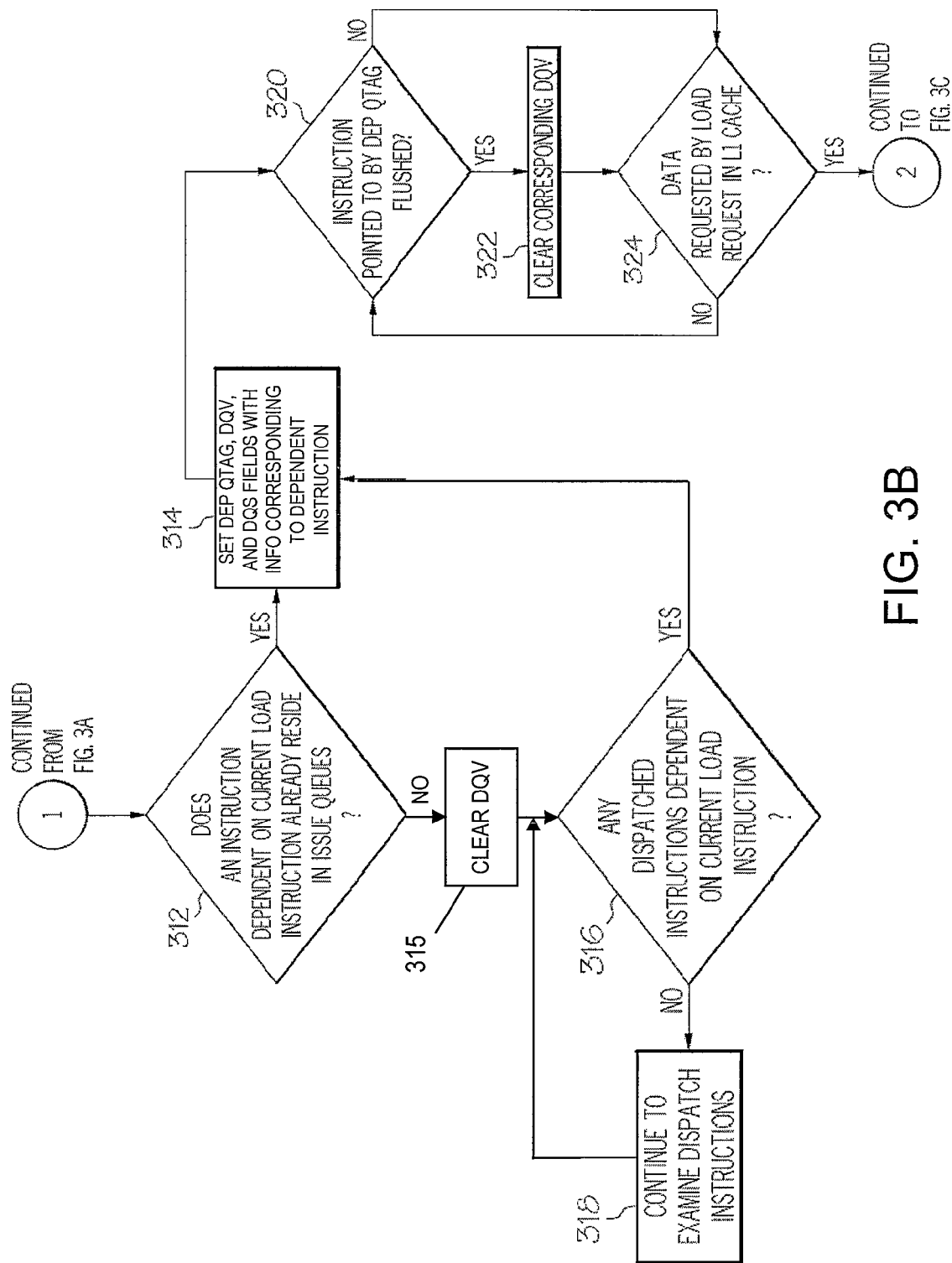
Figure 3C:
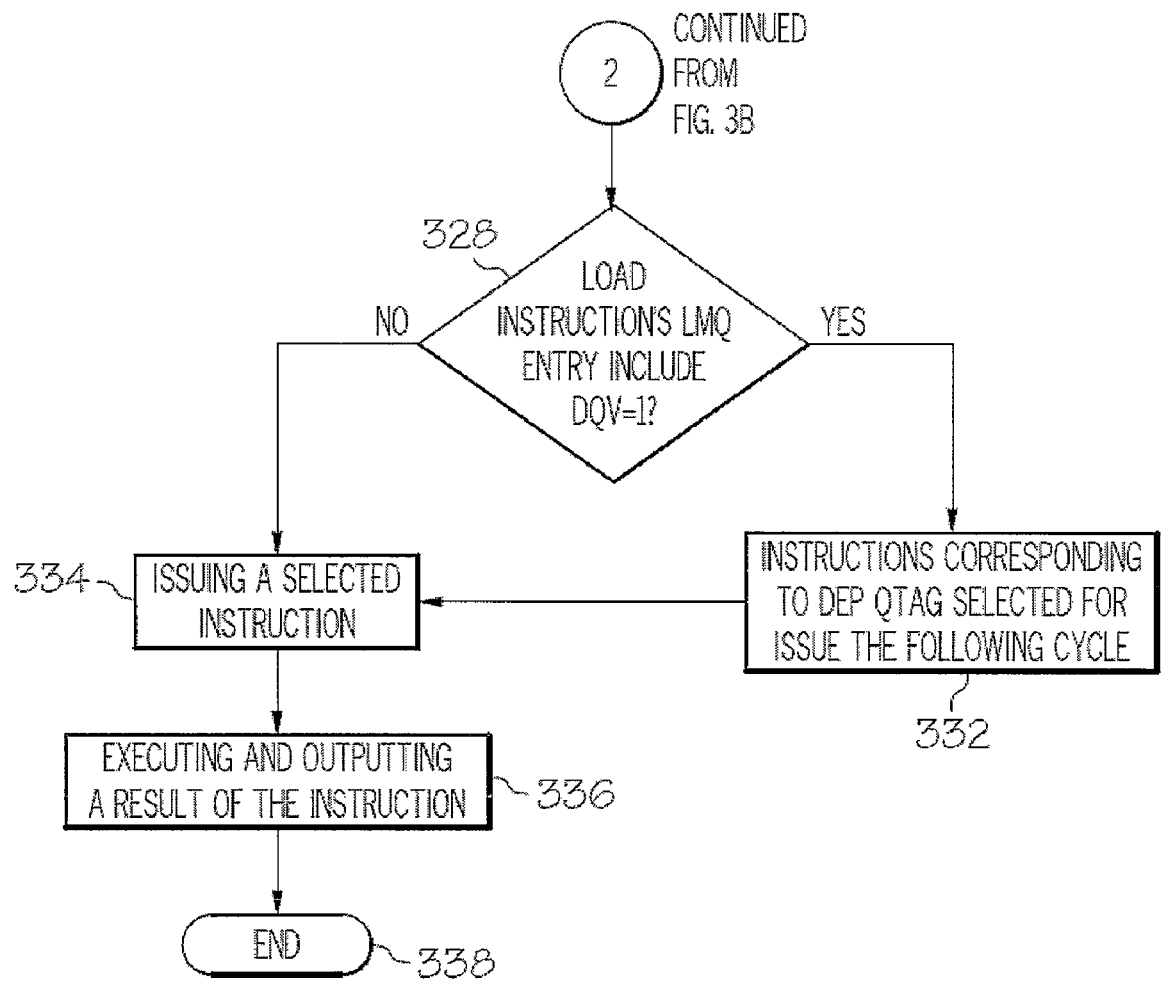

FIG. 3 is a high-level logical flowchart depicting an exemplary method for issuing load-dependent instructions from an issue queue in a data processing system in accordance with an embodiment of the present invention. The process begins at step 300 and proceeds to step 302, which illustrates FXIQ 66 or 68 dispatching a load instruction to LSU 96 or 100. The process continues to step 306, which depicts LSU 96 or 100 determining if the load requested by the load instruction missed L1 D-cache 20. If the load did not miss L1 D-cache 20, the process continues to step 304, which illustrates processor 10 performing other processing. The process then returns to step 302 upon a subsequently dispatched load instruction.

If the load missed L1 D-cache 20, the process proceeds to step 308, which depicts LSU 96 or 100 sending the load instruction to LMQ 116 and allocating an entry within LMQ 116 corresponding to the load instruction. The process continues to step 310, which illustrates LSU 96 or 100 setting RTAG field 202 and TYPE field 210 to indicate the physical address of where the requested load data will be stored and the data type of the requested load data, respectively.

The process continues to step 312, which depicts LMQ 116 determining if the load instruction has any load-dependent instructions that are already present in any of the issue queues. If not, the process continues to step 315, which clears the DQv field 206. Thereafter, the process continues to step 316, which illustrates LMQ 116 determining if any dispatched instructions from latches 44, 46, 48, 50, and 51 are dependent on the current load instruction. If not, the process continues to step 318, which depicts LMQ 116 continuing to examine the dispatched instructions to determine if any of the dispatched instructions are dependent on the current load instruction. The process returns to step 316.

If at step 316 there are dispatched instructions that are dependent on the current load instruction, or if at step 312 the current load instruction has at least one load-dependent instruction that is already present in any of the issue queues, the process continues to step 314, which illustrates LMQ 116 setting Dep QTAG field 204, DQv field 206, and DQs field 208 corresponding to the load-dependent instruction. The process continues to step 320, with LMQ 116 determining if the instruction referred to by Dep QTAG field 204 in the LMQ 116 entry corresponding to the present load instruction has been flushed. Some reasons why an instruction may be flushed include branch prediction errors, instructions that take an exception or interrupt, and the like. If not, the process continues to step 324. If the instruction has been flushed, the process proceeds to step 322, which illustrates LMQ 116 clearing DQv field 206 corresponding to the current load instruction, which indicates that the load-dependent instruction has been flushed from LMQ 116. The DQv field 206 can be cleared according to various embodiments. For example, in some embodiments, a Dep QTAG field 204 entry of LMQ 116 can compare against flushed instructions referred to by Dep QTAG fields 204 in the LMQ 116, and use compare hits to clear the corresponding DQv field 206. In other embodiments, all DQv fields 206 in LMQ 116 corresponding to a flushed thread can be cleared.

In some embodiments of the present invention, the number of compares for dispatched consumers against LMQ 116 entry producers can be reduced by only comparing consumers that do not currently have their data ready, which means that a given consumer's producer has not been executed yet in order to generate the data for the consumer. If a given consumer already has its data ready, then it is not necessary to perform compares against producers since the consumer is already woken up.

According to a first embodiment of the present invention, selecting a dependent QTAG (e.g., Dep QTAG field 204) for issue the following cycle will be acceptable most of the time, since the load dependent instructions' other sources would also likely be ready. If the dependent QTAG is selected for issue the following cycle, but the dependent QTAG has a different source that is not ready for issue, then the instruction corresponding to the dependent QTAG cannot be issued as well. This effectively leads to a wasted issue cycle, since the normal age-based mechanism may have selected an instruction to issue. Essentially, this embodiment of the present invention speculates that other sources of the consumer will be ready when selected for issue by the dependent QTAG.

According to a second embodiment of the present invention, LMQ 116 may only set the bit in DQv field 206 if all of the other sources in the load-dependent instruction are ready. This removes the speculation as described in the first embodiment, but also limits the potential number of cases where a fast wakeup can occur.

According to a third embodiment of the present invention, LMQ 116 gives priority (in selecting the next issue QTAG pointer) to the normal age-based issue selection, over the fast dependent QTAG wakeup. The normal age-based selection is usually non-speculative, so if no instruction is found to be ready with this selection, then the dependent QTAG is selected. In this case, if the dependent instruction does not have all of its sources ready for issue, it does not issue. This is not a wasted slot, since the normal age-based issue selection did not find a ready instruction either. However, the fast wakeup of dependent instructions may benefit the performance of a critical section of code, in which case giving fast wakeup lower priority would hurt overall performance.

According to a fourth embodiment of the present invention, a soft switch (e.g., a programmable register, etc.) may be implemented by hardware, software, or a combination of hardware and software to select between any of the three embodiments of the present invention described above. Software can be optimized to select an embodiment of the present invention that would be most beneficial performance-wise to the currently executing computer code.

Returning to step 324, LMQ 116 determines if a load recycle has occurred for the current load instruction, as illustrated. If not, the process returns to step 320. If so, the process continues to step 328, which illustrates LMQ 116 determining if DQv field 206 corresponding to the current load instruction has a value of 1. If not, the process continues to step 334, which illustrates a selected instruction being issued by an issue queue to a corresponding execution unit. Since there is no load-dependent instruction in the issue queue yet, the normal age-based selection is used. The process proceeds to step 336, which depicts the execution unit executing the selected instruction and outputting the result of the execution. The process ends, as illustrated in step 338.

Returning to step 328, if LMQ 116 determines that DQv field 206 corresponding to the current load instruction has a value of 1, the process continues to step 332, which depicts LMQ 116 selecting the instruction corresponding to Dep QTAG field 204 for issue during the next cycle. Thus, the normal broadcast of the load data tag against the issue queue and age-based issue selection are both bypassed, which would take an additional cycle. It should be understood that a load dependent instruction can reside in any of issue queues FXIQ 66, FXIQ 68, FPIQ 70, FPIQ 72, or VRIQ 73. TYPE field 210 can be utilized to determine the particular issue queue in which the load-dependent instruction resides. The process continues to step 334, which illustrates a selected instruction being issued by an issue queue to a corresponding execution unit. The process proceeds to step 336, which depicts the execution unit executing the selected instruction and outputting the result of the execution. The process ends, as illustrated in step 338.

Figure 4:
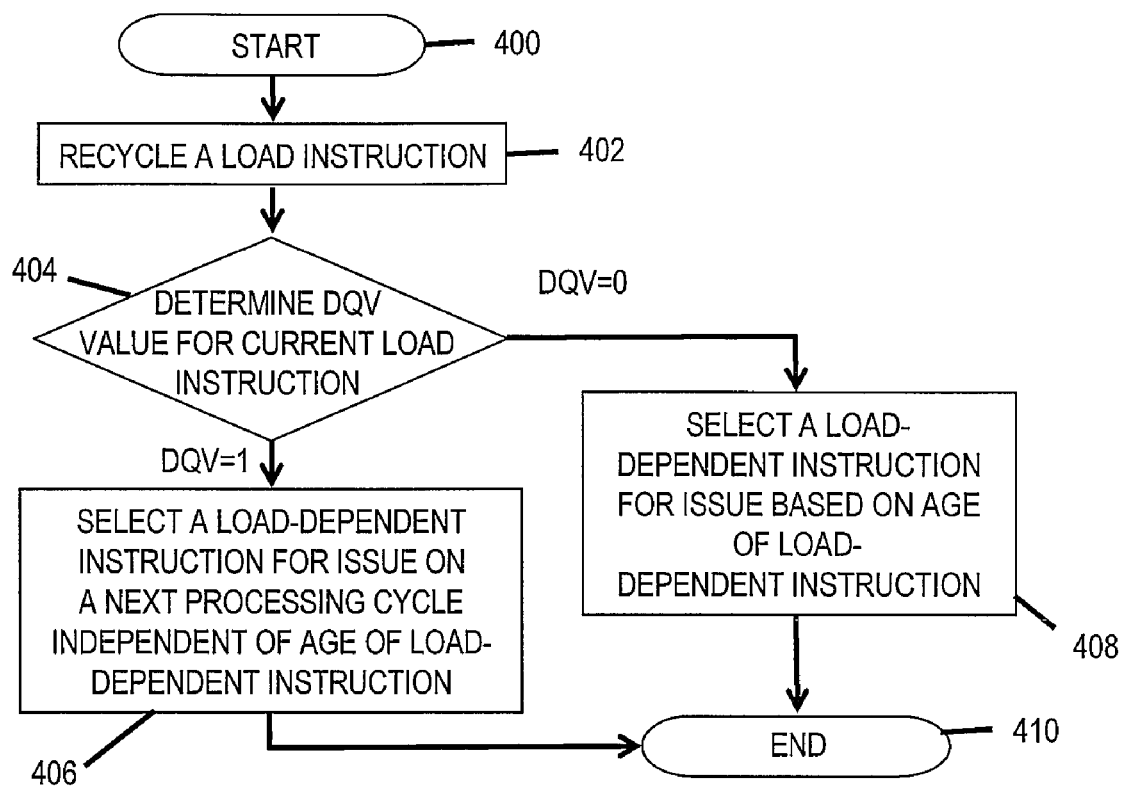
FIG. 4 is a logical flowchart illustrating an exemplary method for selecting load-dependent instructions in accordance with various embodiments of the present invention.

FIGS. 4-7 illustrate exemplary methods for various embodiments of the present invention, as discussed above. In particular, FIG. 4 is a logical flowchart illustrating an exemplary method for selecting load-dependent instructions in accordance with various embodiments of the present invention. The process begins at step 400 and proceeds to step 402, which illustrates LMQ 116 determining that a load recycle has occurred for the current load instruction. The process continues to step 404, which depicts LMQ 116 determining a value of DQv field 206 corresponding to the current load instruction. If DQv field 206 has a value of 1, the process continues to step 406, which illustrates selecting a load-dependent instruction for issue on a next processing cycle independent of the normal age-based selection (i.e., utilizing the fast dependent QTAG wakeup). The process then ends, as illustrated in step 410. Returning to step 404, if DQv field 206 has a value of 0, the process continues to step 408, which illustrates selecting a load-dependent instruction for issue according to the normal age-based selection. The process ends, as illustrated in step 410.

Figure 5:
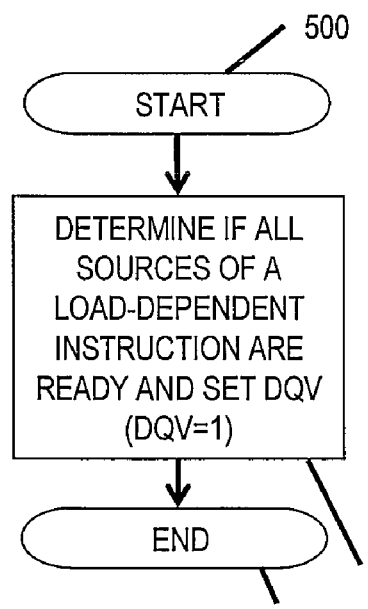
FIG. 5 is a logical flowchart illustrating an exemplary method for setting a load miss queue field in accordance with various embodiments of the present invention.

FIG. 5 is a logical flowchart illustrating an exemplary method for setting a load miss queue field in accordance with various embodiments of the present invention. The process begins at step 500 and proceeds to step 502, which illustrates LMQ 116 determining if all of the other sources in a load-dependent instruction are ready and setting the bit in DQv field 206 (i.e., DQv=1). The process then ends, as illustrated in step 504.

Figure 6:
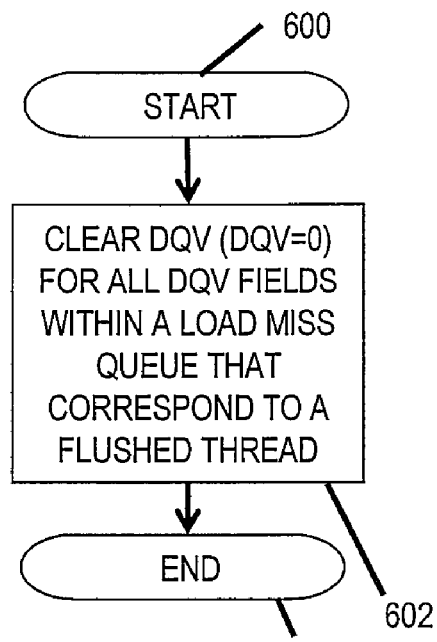
FIG. 6 is a logical flowchart illustrating an exemplary method for clearing a load miss queue field in accordance with an embodiment of the present invention.

FIG. 6 is a logical flowchart illustrating an exemplary method for clearing a load miss queue field in accordance with an embodiment of the present invention. The process begins at step 600 and proceeds to step 602, which illustrates LMQ 116 clearing all DQv fields 206 (i.e., DQv=0) in LMQ 116 that correspond to a flushed thread. The process then ends, as illustrated in step 604.

Figure 7:
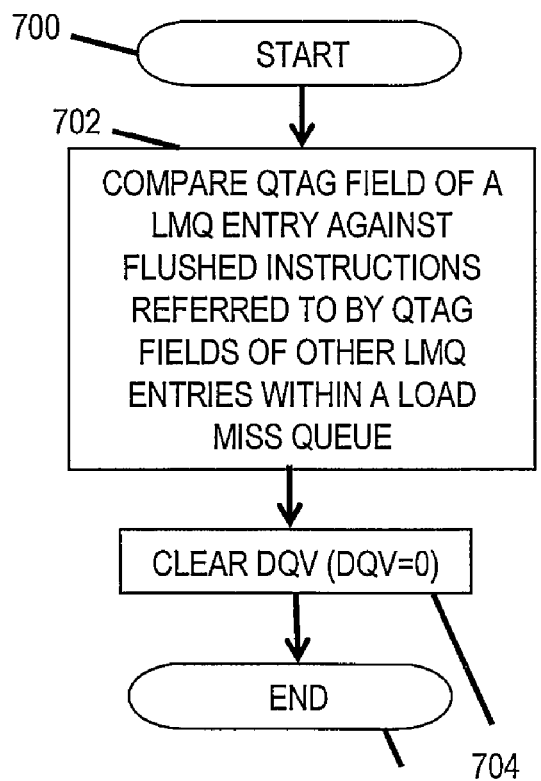
FIG. 7 is a logical flowchart illustrating an exemplary method for clearing a load miss queue field in accordance with an alternative embodiment of the present invention.

FIG. 7 is a logical flowchart illustrating an exemplary method for clearing a load miss queue field in accordance with an alternative embodiment of the present invention. The process begins at step 700 and proceeds to step 702, which illustrates a Dep QTAG field 204 entry of LMQ 116 comparing against flushed instructions referred to by other Dep QTAG fields 204 in the LMQ 116. The process proceeds to step 704, which depicts LMQ 116 using compare hits to clear the corresponding DQv field 206 (i.e., DQv=0). The process then ends, as illustrated in step 706.

It should be understood that one or more aspects of the present invention may alternatively be implemented in a computer usable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore not to be taken in a limiting sense, and the scope of the present invention is defined only by the appended claims.

As will be further appreciated, the processes in embodiments of the present invention may be implemented using software, firmware, hardware, or any combination thereof or their equivalent. As a preparatory step to practicing the invention in software, the programming code (whether software or firmware) may be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. In some embodiments, transmission type media may include computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer-implementable method for issuing load-dependent instructions from an issue queue in a processing unit in a data processing system, said computer-implementable method comprising:
    providing a load miss queue comprising a physical address field that indicates where load instruction data is stored for said load miss queue, an issue queue position field that indicates an issue queue position of a load-dependent instruction, a valid identifier field that indicates if said load-dependent instruction is valid, a source identifier field that indicates a source of said load-dependent instruction that is dependent on a load instruction, and a data type field that indicates a type of said load instruction data;
    dispatching said load instruction that misses a first level cache;
    in response to dispatching said load instruction, setting both of said physical address field and said data type field;
    identifying said load-dependent instruction, wherein said load-dependent instruction comprises one or more from the group consisting of: an instruction present in one of a plurality of issue queues; and an instruction dispatched from one of a plurality of latches;
    in response to identifying said load-dependent instruction, setting each of said issue queue position field, said valid identifier field, and said source identifier field;
    determining if said issue queue position field refers to a flushed instruction;
    in response to determining said issue queue position field refers to a flushed instruction, clearing said valid identifier field, wherein clearing said valid identifier field further comprises:
    comparing said issue queue position field against flushed instructions referred to by other issue queue position fields within said load miss queue;
    in response to comparing said issue queue position field against flushed instructions referred to by other issue queue position fields, clearing said valid identifier field;
    recycling said load instruction, in response to recycling said load instruction, determining a value of said valid identifier field; and
    in response to determining said value of said valid identifier field, selecting said load-dependent instruction for issue on a next processing cycle independent of an age of said load-dependent instruction.

2. The computer-implementable method according to claim 1, wherein clearing said valid identifier field further comprises:
    clearing all valid identifier fields within said load miss queue that correspond to a flushed thread.

3. The computer-implementable method according to claim 1, wherein setting said valid identifier field further comprises:
    determining if all sources of said load-dependent instruction are ready; and
    in response to determining if all sources of said load-dependent instruction are ready, setting said valid identifier field.

4. The computer-implementable method according to claim 1, further comprising:
    in response to determining said value of said valid identifier field, selecting said load-dependent instruction for issue based on said age of said load-dependent instruction.

5. A system for issuing load-dependent instructions from an issue queue in a processing unit in a data processing system, said system comprising:
    at least one processing unit;
    an interconnect coupled to said at least one processing unit; and
    a computer usable medium embodying computer program code, said computer usable medium being coupled to said interconnect, said computer program code comprising instructions executable by said at least one processing unit and configured for:
    providing a load miss queue comprising a physical address field that indicates where load instruction data is stored for said load miss queue, an issue queue position field that indicates an issue queue position of a load-dependent instruction, a valid identifier field that indicates if said load-dependent instruction is valid, a source identifier field that indicates a source of said load-dependent instruction that is dependent on a load instruction, and a data type field that indicates a type of said load instruction data;
    dispatching said load instruction that misses a first level cache;
    in response to dispatching said load instruction, setting both of said physical address field and said data type field;
    identifying said load-dependent instruction, wherein said load-dependent instruction comprises one or more from the group consisting of: an instruction present in one of a plurality of issue queues; and an instruction dispatched from one of a plurality of latches;

in response to identifying said load-dependent instruction, setting each of said issue queue position field, said valid identifier field, and said source identifier field;

determining if said issue queue position field refers to a flushed instruction;

in response to determining said issue queue position field refers to a flushed instruction, clearing said valid identifier field, wherein said instructions are further configured for:

comparing said issue queue position field against flushed instructions referred to by other issue queue position fields within said load miss queue;

in response to comparing said issue queue position field against flushed instructions referred to by other issue queue position fields, clearing said valid identifier field;

recycling said load instruction, in response to recycling said load instruction, determining a value of said valid identifier field; and in response to determining said value of said valid identifier field, selecting said load-dependent instruction for issue on a next processing cycle independent of an age of said load-dependent instruction.

6. The system according to claim 5, wherein said instructions are further configured for:

clearing all valid identifier fields within said load miss queue that correspond to a flushed thread.

7. The system according to claim 5, wherein said instructions are further configured for:

determining if all sources of said load-dependent instruction are ready; and in response to determining if all sources of said load-dependent instruction are ready, setting said valid identifier field.

8. The system according to claim 5, wherein said instructions are further configured for:

in response to determining said value of said valid identifier field, selecting said load-dependent instruction for issue based on said age of said load-dependent instruction.

* * * * *